(12) United States Patent
Zhong et al.

(10) Patent No.: US 11,705,774 B2
(45) Date of Patent: Jul. 18, 2023

(54) INDUSTRIAL ELECTRICAL MACHINE SYSTEM AND ELECTRONICS MODULE

(71) Applicant: ABB Schweiz AG, Baden (CH)

(72) Inventors: Sheng Zhong, Hillsborough, NC (US); Darren Tremelling, Apex, NC (US); Elio Perigo, Raleigh, NC (US)

(73) Assignee: ABB Schweiz AG, Baden (CH)

(*) Notice: Subject to any disclaimer, the term of this patent is extended or adjusted under 35 U.S.C. 154(b) by 608 days.

(21) Appl. No.: 16/234,298

(22) Filed: Dec. 27, 2018

(65) Prior Publication Data
US 2020/0212756 A1 Jul. 2, 2020

(51) Int. Cl.
| | |
|---|---|
| H02K 5/22 | (2006.01) |
| H01R 13/52 | (2006.01) |
| H01R 31/06 | (2006.01) |
| H02K 11/04 | (2016.01) |
| H02K 11/33 | (2016.01) |
| H02K 5/10 | (2006.01) |
| H02K 11/05 | (2016.01) |
| H01R 13/50 | (2006.01) |

(52) U.S. Cl.
CPC .......... *H02K 5/225* (2013.01); *H01R 13/521* (2013.01); *H01R 13/5219* (2013.01); *H01R 31/065* (2013.01); *H02K 5/10* (2013.01); *H02K 11/05* (2016.01); *H02K 11/33* (2016.01); *H01R 13/50* (2013.01)

(58) Field of Classification Search
CPC .. H01R 13/50; H01R 13/521; H01R 13/5219; H01R 31/065; H02K 11/044; H02K 11/046; H02K 11/33; H02K 5/10; H02K 5/225

USPC .......................................................... 310/71
See application file for complete search history.

(56) References Cited

U.S. PATENT DOCUMENTS

| | | | | |
|---|---|---|---|---|
| 4,507,720 A | * | 3/1985 | Colbrese | B60L 55/00 363/13 |
| 4,595,839 A | * | 6/1986 | Braun | G02B 6/4202 250/551 |
| 4,992,925 A | | 2/1991 | Meyer | |
| 6,234,842 B1 | | 5/2001 | Keay et al. | |
| 6,472,785 B2 | | 10/2002 | Petit et al. | |

(Continued)

OTHER PUBLICATIONS

VLT Integrated Servo Drive ISD 410 Brochure (2 pages).
Canadian Patent Office, Office Action issued in corresponding Application No. 3,055,974, dated Apr. 7, 2021, 6 pp.

*Primary Examiner* — Alex W Mok
(74) *Attorney, Agent, or Firm* — Leydig, Voit & Mayer, Ltd.

(57) ABSTRACT

An industrial electrical machine system includes an industrial electrical machine including a first housing and a first plug-in electrical connector disposed on the first housing; and an electronics module including a second housing; a converter disposed in the second housing and constructed to convert an input electrical power to an output electrical power; a second plug-in electrical connector electrically coupled to the converter and constructed to sealingly engage and electrically couple to the first plug-in electrical connector and electrically couple the converter to the industrial electrical machine and supply the output electrical power to the industrial electrical machine from the converter, wherein the industrial electrical machine is a motor, a generator or a motor/generator.

18 Claims, 3 Drawing Sheets

(56) References Cited

U.S. PATENT DOCUMENTS

| | | | |
|---|---|---|---|
| 7,104,847 B2* | 9/2006 | Sodemann | H02J 9/066 |
| | | | 290/1 A |
| 7,216,732 B2 | 5/2007 | Angerer et al. | |
| 8,278,790 B2* | 10/2012 | Rueggen | H02K 5/225 |
| | | | 310/68 D |
| 9,806,445 B2* | 10/2017 | Fornage | H01R 12/592 |
| 2003/0132040 A1* | 7/2003 | Radosevich | H02M 7/003 |
| | | | 180/65.1 |
| 2003/0133257 A1* | 7/2003 | Beihoff | B60L 50/50 |
| | | | 361/600 |
| 2003/0133267 A1* | 7/2003 | Beihoff | H05K 7/20927 |
| | | | 361/704 |
| 2003/0133282 A1* | 7/2003 | Beihoff | H02M 1/44 |
| | | | 361/818 |
| 2003/0133283 A1* | 7/2003 | Beihoff | H02M 7/003 |
| | | | 361/818 |
| 2005/0088866 A1* | 4/2005 | Levine | H01R 13/70 |
| | | | 363/146 |
| 2005/0186857 A1* | 8/2005 | Sichner | H05K 7/1478 |
| | | | 439/717 |
| 2007/0015416 A1* | 1/2007 | Gutierrez | H01R 24/64 |
| | | | 439/676 |
| 2007/0267926 A1* | 11/2007 | Hauenstein | B60L 15/20 |
| | | | 310/64 |
| 2008/0084141 A1* | 4/2008 | Schueren | H02K 5/225 |
| | | | 310/68 B |
| 2008/0233773 A1* | 9/2008 | Meleck | H01R 13/64 |
| | | | 439/107 |
| 2009/0139740 A1* | 6/2009 | Lindsey | B60R 16/0215 |
| | | | 174/50.5 |
| 2009/0231811 A1 | 9/2009 | Tokuyama et al. | |
| 2010/0127602 A1* | 5/2010 | Rueggen | H02K 5/225 |
| | | | 310/68 D |
| 2010/0247352 A1* | 9/2010 | Hansen | F04D 29/605 |
| | | | 417/410.1 |
| 2012/0126645 A1* | 5/2012 | Gruetzmacher | H02M 1/32 |
| | | | 310/71 |
| 2013/0154414 A1* | 6/2013 | Bohatsch | H02K 5/04 |
| | | | 310/89 |
| 2013/0344818 A1* | 12/2013 | McGuire | G05B 19/0423 |
| | | | 455/73 |
| 2014/0050603 A1* | 2/2014 | Hoj | F04D 29/426 |
| | | | 417/410.1 |
| 2014/0251972 A1* | 9/2014 | Garvey | H01R 4/56 |
| | | | 219/137.61 |
| 2014/0332235 A1* | 11/2014 | Mueller | E21B 47/017 |
| | | | 166/378 |
| 2015/0295341 A1* | 10/2015 | Elmvang | H01R 29/00 |
| | | | 439/374 |
| 2016/0181893 A1 | 6/2016 | Shrestha et al. | |
| 2016/0301111 A1* | 10/2016 | Tyler | H01M 50/50 |
| 2017/0149363 A1* | 5/2017 | Schroedel | H01R 24/20 |
| 2017/0311399 A1* | 10/2017 | Shah | F21V 23/009 |
| 2017/0343006 A1* | 11/2017 | Ehrsam | F04D 13/064 |

\* cited by examiner

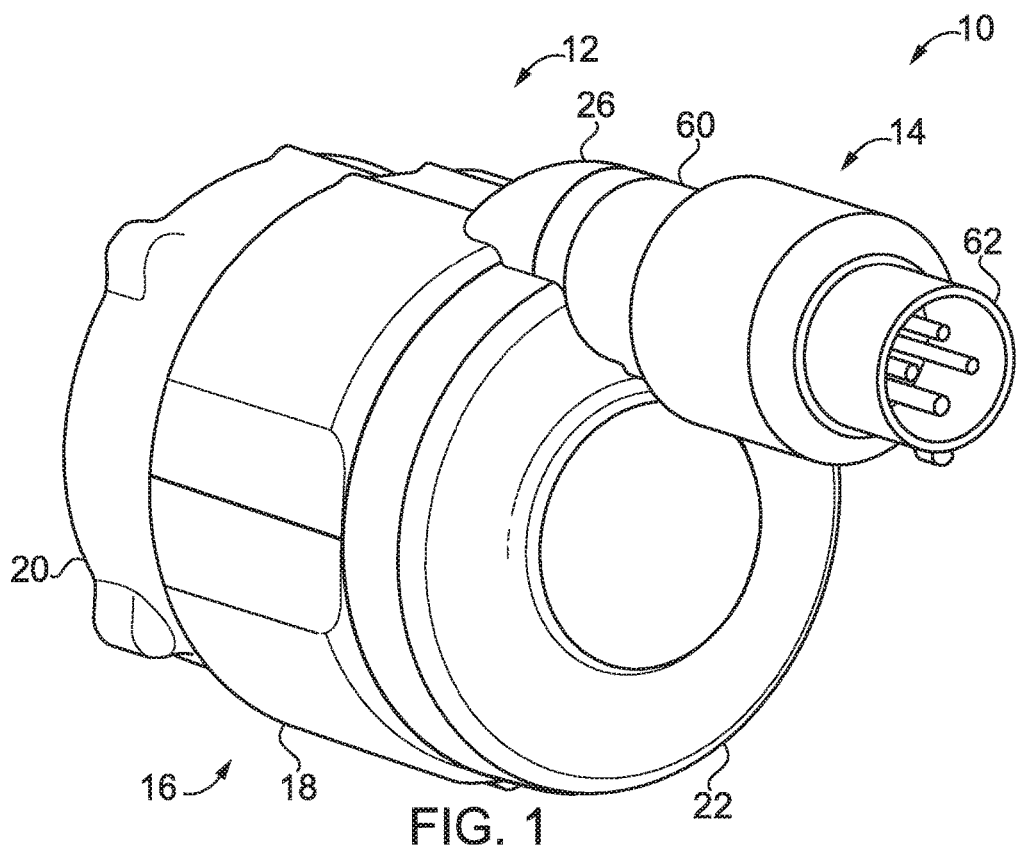
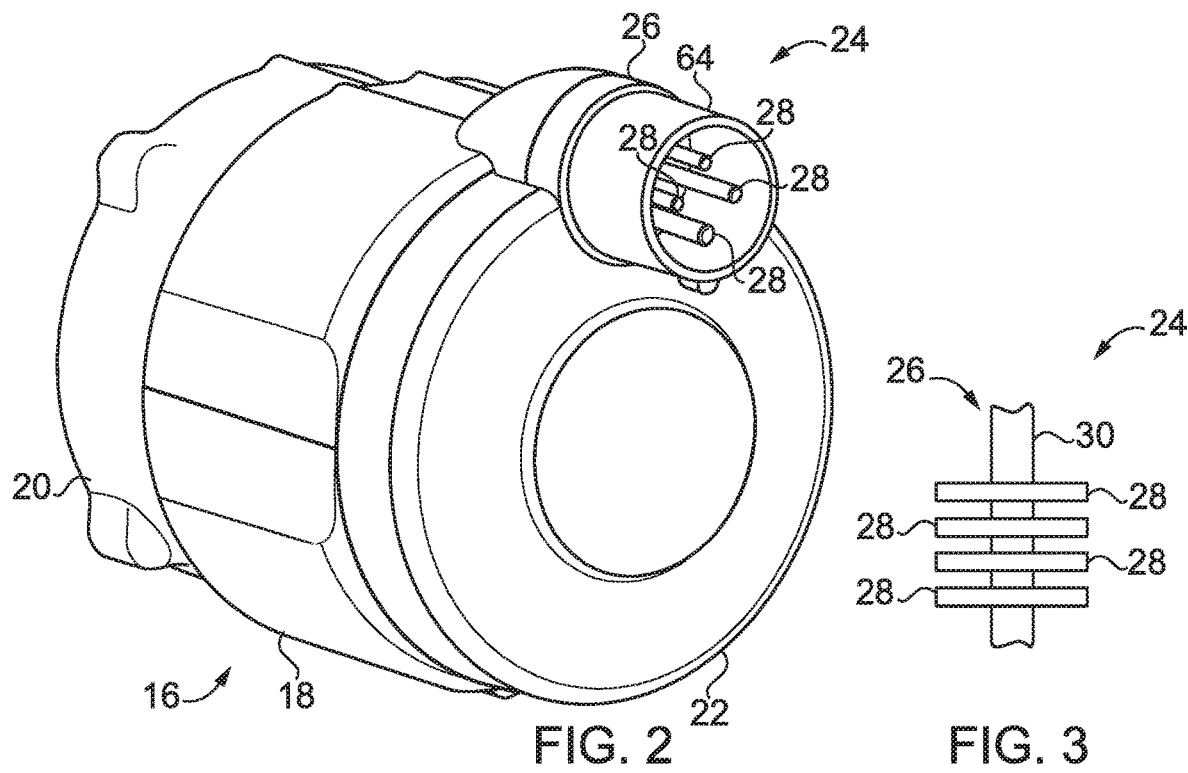

INDUSTRIAL ELECTRICAL MACHINE SYSTEM AND ELECTRONICS MODULE

TECHNICAL FIELD

The present application relates generally to electrical machines and more particularly, but not exclusively, to industrial electrical machine systems and electronics modules therefor.

BACKGROUND

Industrial electrical machine systems remain an area of interest. Some existing systems have various shortcomings, drawbacks and disadvantages relative to certain applications. For example, in some washdown configurations, washdown of the system may damage the housings or require expensive stainless steel housings, and may also be expensive to install. Accordingly, there remains a need for further contributions in this area of technology.

SUMMARY

Embodiments of the present invention include unique industrial electrical machine systems and unique electronics modules for industrial electrical machines. Other embodiments include apparatuses, systems, devices, hardware, methods, and combinations for electrical machine systems and electronics modules therefor. Further embodiments, forms, features, aspects, benefits, and advantages of the present application shall become apparent from the description and figures provided herewith.

BRIEF DESCRIPTION OF THE FIGURES

The description herein makes reference to the accompanying drawings wherein like reference numerals refer to like parts throughout the several views, and wherein:

FIG. 1 illustrates some aspects of a non-limiting example of an industrial electrical machine system in accordance with an embodiment of the present invention.

FIG. 2 illustrates some aspects of a non-limiting example of an industrial electrical machine in accordance with an embodiment of the present invention.

FIG. 3 schematically illustrates some aspects of a non-limiting example of a plug-in electrical connector included with the industrial electrical machine of FIGS. 1 and 2.

DETAILED DESCRIPTION OF THE ILLUSTRATIVE EMBODIMENTS

Figure 4B:
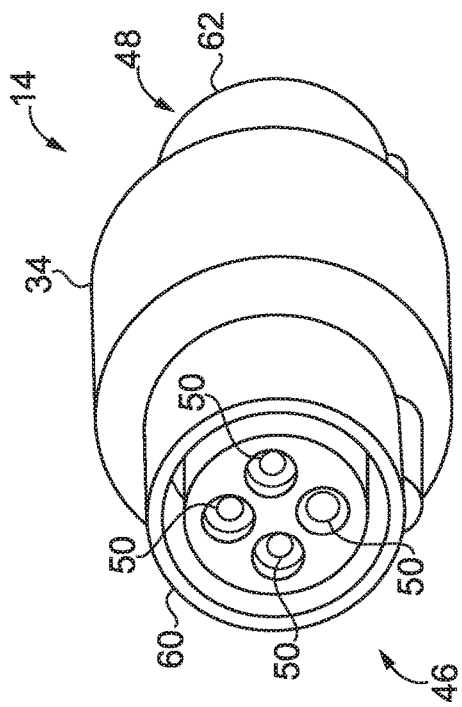
FIGS. 4A-4D illustrate some aspects of a non-limiting example of an electronics module for use with an electrical machine in accordance with an embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Referring to FIGS. 1-3, some aspects of a non-limiting example of an industrial electrical machine system 10 in accordance with an embodiment of the present invention are illustrated. Industrial electrical machine system 10 includes an industrial electrical machine 12 and an electronics module 14. In one form, electronics module 14 is constructed to provide variable frequency power to electrical machine 12 to operate electrical machine 12 as a variable speed machine. In one form, industrial electrical machine 12 is an industrial motor. In other embodiments, industrial electrical machine 12 may be an industrial motor or a motor/generator. In other embodiments, electrical machine 12 may not be an industrial electrical machine. In a particular form, electrical machine 12 is an industrial totally enclosed non ventilated (TENV) washdown machine constructed for use mainly in the food and beverage industry, and subject to being washed down with water, detergents, solvents, e.g., organic solvents, and other fluids, at least some of which may be or contain corrosive fluids and/or volatiles. An industrial electrical machine is an electrical machine that is fixed in place or mounted to a movable structure, not handheld, and is used in industry for one or more of various industrial or other purposes, e.g., in industrial processes, in the fabrication of industrial or consumer chemicals, materials and goods, the provision of consumer and industrial services, manufacturing facilities, municipalities, material handling and other industry, and is not an electrical machine used in consumer products, such as tools used around the home and in home or home-like workshops, such as handheld or fixed electric drills, electric screwdrivers, electric saws and the like used in home and home-like workshops, home appliances, automobile accessory electrical machines, e.g., window motors, cabin heater or air conditioning fan motors or the like. Industrial electrical machines may operate in harsher environments, e.g., chemicals, solvents, contamination, etc., that consumer electrical machines are not subject to or capable of being subject to without excessive damage. An industrial electrical machine as that term is used herein includes electrical machines with power ratings up to about 5 hp, in some embodiments, and power ratings up to or in excess of about 25 hp in other embodiments.

Industrial electrical machine 12 includes a housing 16 constructed to house a stator, rotor, shaft, bearings and bearing sleeves (not shown), to structurally support electrical machine 12, and to react industrial electrical machine 12 torque loads, overhang moment loads, torsional loads and thrust loads. Housing 16 includes a stator band 18, e.g., for supporting a motor stator, a drive end endplate 20 and a non-drive end endplate 22. Drive end endplate 20 and/or non-drive end endplate 22 may be integral with stator band 18. Industrial electrical machine 12 also includes a plug-in electrical connector 24, e.g., a motor input plug-in electrical connector, which is disposed on housing 16 and extends from housing 16. Plug-in electrical connector 24 includes a connector housing 26 that is integral with housing 16, e.g., integral with stator band 18 and/or non-drive end endplate 22. In one form, plug-in electrical connector 24 is a male plug. In other embodiments, plug-in electrical connector 24 may be a female receptacle. In one form, plug-in electrical connector 24 is a multipronged connector constructed to engage and electrically couple to a standard 4-pin 230 V electrical connector, e.g., is a multipronged male connector, such as a 4-pin 230 V male electrical connector constructed to engage a standard 4-pin 230 V female electrical connector. In other embodiments, plug-in electrical connector 24 may take other forms, including a 4-pin 230 V female electrical connector or another multipronged connector. In still other embodiments, plug-in electrical connector 24 may be configured as a 480 V connector or may be configured for or to accommodate other voltages and with any suitable power rating. Because industrial electrical machine 12 includes plug-in electrical connector 24, an electrician is not necessary to electrically install industrial electrical machine 12. Rather, electrical machine system 10 or electrical machine 12 may simply be plugged in in order to electrically connect electrical machine system 10 and electrical machine 12 to a source of electrical power and in some embodiments, a control signal source, e.g., for a speed control signal.

In one form, industrial electrical machine 12 is a polymer injection-molded machine. Housing 16, including stator band 18, drive end endplate 20, non-drive end endplate 22 and connector housing 26 are polymeric, i.e., made of or formed of a polymeric material, and is constructed to provide industrial electrical machine 12 fluid ingress protection and prevent the ingress of fluids into the respective industrial electrical machine 12. In a more particular form, housing 16 is made of a thermoplastic. In other embodiments, housing 16 may be made of one or more thermoset materials. In still other embodiments, housing 16 may also or alternatively be formed of one or more other polymeric materials. The polymeric material used to form housing 16 is constructed and configured to provide chemical resistance to a wide range of chemicals and/or to particular chemicals for selected applications, including strong mechanical performance, and thermal and chemical or environmental stability. Examples of polymeric materials that may be used to form housing 16 include one or more polymer materials, or polymer composite materials, including but not limited to acetal and ketal based polymers and copolymers, polyesters (e.g. polyethylene terephthalate, polybutylene terephthalate), polycarbonate, polystyrene, polyether sulfone (PESU), polyphenylene sulfone (PPSU), polysulfone, and polytetrafluoroethylene (PTFE). Other polymers can also be implemented, including but not limited to polyvinyl chloride (PVC), polyethylene, polypropylene, polyetherimide (PEI), polyphenylene sulfide (PPS), polyether ether ketone (PEEK), polyphthalamide (PPA), polyoxymethylene (POM), phenolformaldehyde (PF), unsatured polyester (UP), polyurethane (PUR and PU), polyimide, polyamide, polyvinyl alcohol, polyvinylidene chloride, polyacrylonitrile and polyalkylene paraoxybenzoate. In some embodiments, the composite can include a variety of types of fibers, including but not limited to carbon fiber, glass fiber, wool, silk, cotton, rayon, cellulose, cellulose acetate, flax, ramie, jute and aramid fibers. In some embodiments, additives can be used to improve the qualities of the materials, including but not limited to the mechanical and thermal stability, chemical resistance, insulation property and flammability. The additives can include, but are not limited to, ceramics, alumina, calcium silicate, flame retardants and clays.

Plug-in electrical connector 24 includes a plurality of individual connector terminals 28 that are overmolded into and extending through an end wall 30 of connector housing 26 of housing 16, thus hermetically sealing portions of terminals 28 that are internal to connector housing 26 and preventing ingress, e.g., fluid ingress into industrial electrical machine 12 via plug-in electrical connector 24. The term, "overmolded" as used herein refers to a characteristic structural form wherein the components are said to be overmolded if one of the components is a molded component, formed by molding, e.g., the polymeric material forming housing 16, and is molded to encapsulate another of the components to a degree that certain geometric features of the other component are encapsulated by or contained wholly or partially within or constrained by certain geometric features of the molded component, such that the components are locked to and sealed against each other and cannot be removed from each other without fracturing or damaging one or more of the components. Overmolding may be achieved by, for example, injection molding, compression molding, transfer molding, other molding processes or by potting.

Figure 4D:
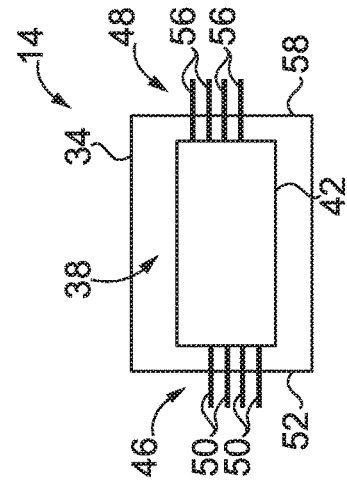
Figure 4A:
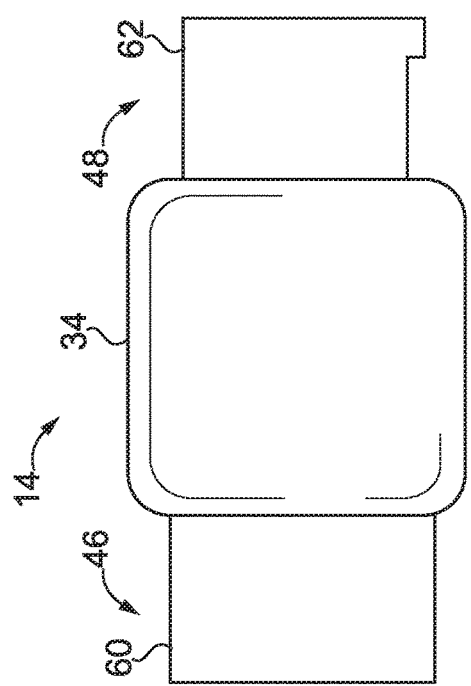
Figure 4C:
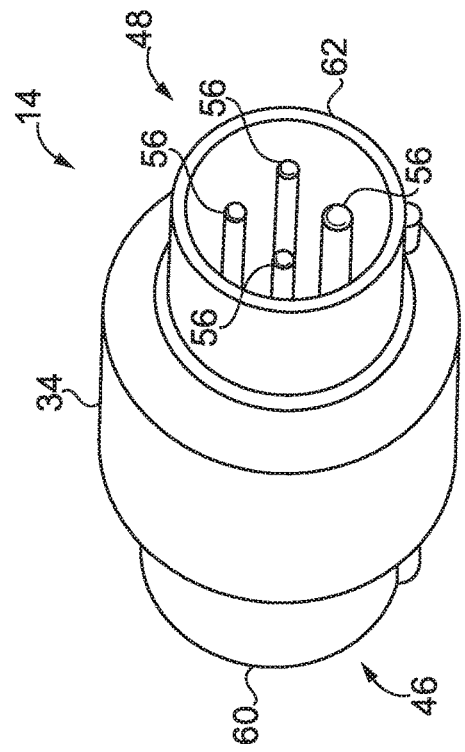
Figure 5:
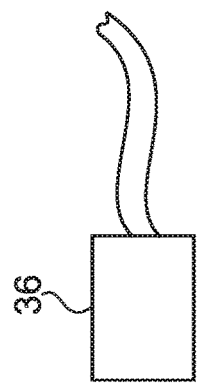
FIG. 5 illustrates some aspects of a non-limiting example of a power supply plug-in electrical connector for use with some embodiments of the present invention.
Figure 6:
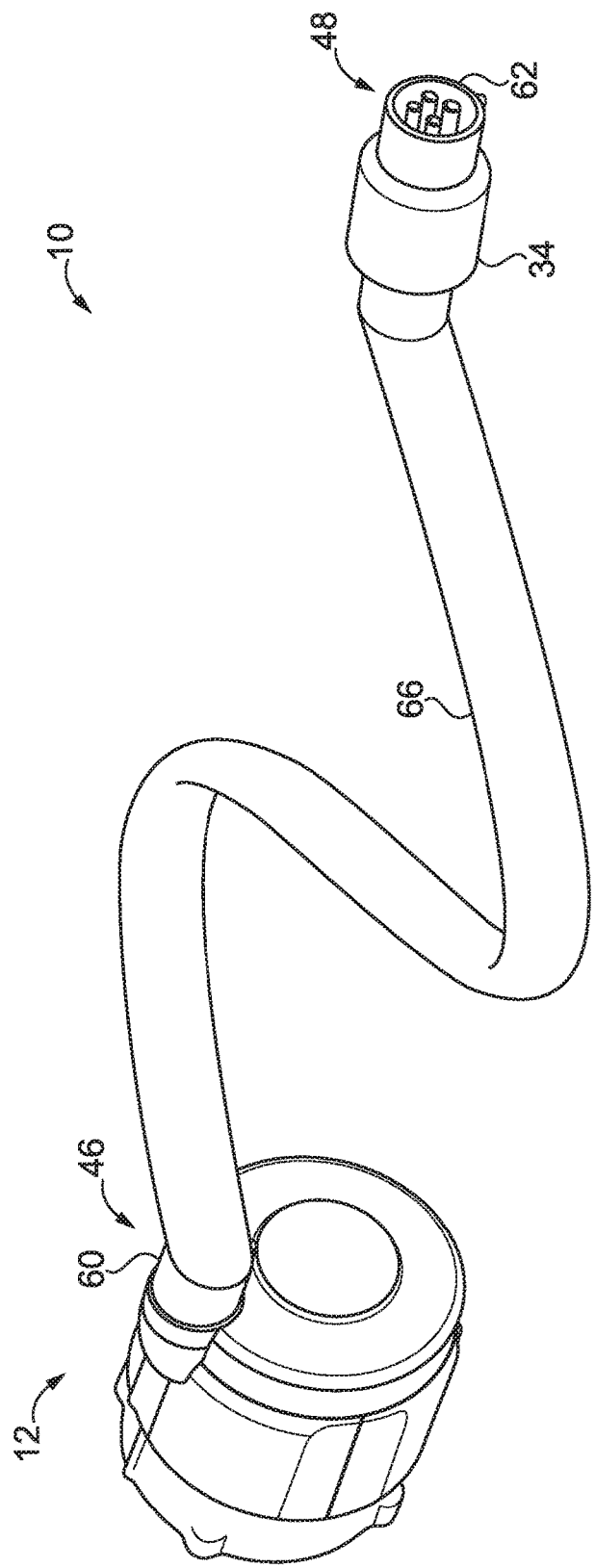
FIG. 6 illustrates some aspects of a non-limiting example of an industrial electrical machine system in accordance with an embodiment of the present invention.

Referring also to FIGS. 4A-4D, 5 and 6, some aspects of a non-limiting example of electronics module 14 for operating industrial electrical machine using power supplied from a power supply plug-in electrical connector 36 are illustrated in accordance with an embodiment of the present invention. Electronics module 14 is constructed to engage and electrically couple to power supply plug-in electrical connector 36 to receive electrical power for conversion and supply to industrial electrical machine 12, e.g., via an electronics module input plug-in connector described below. Power supply plug-in electrical connector 36 is electrically coupled to a power source, e.g., a factory, local, municipal or regional electrical power grid.

Electronics module 14 includes an electronics module housing 34, and power and control electronics 38 disposed in electronics module housing 34. In one form, electronics module housing 34 is cylindrical, e.g., to promote ready cleaning and shedding of fluids during and after washdown of industrial electrical machine system 10. Electronics module housing 34 is polymeric, e.g., made of one or more of the polymeric materials mentioned above with respect to housing 16. Power and control electronics 38 includes a converter 42. Converter 42 is disposed in electronics module housing 34. In some embodiments, power and control electronics 38 and/or converter 42 may also include an inverter, a rectifier and/or other electrical and/or electronic components disposed in electronics module housing 34. Converter 42 is constructed and operative receive AC electrical power from power supply plug-in electrical connector 36 at a fixed frequency and convert the power to AC electrical power at a desired fixed or variable frequency for provision to industrial electrical machine 12. In other embodiments, converter 42 may also or alternatively be constructed to perform DC to DC conversion to supply DC electrical power to industrial electrical machine 12 and/or AC to DC conversion to supply DC electrical power to industrial electrical machine 12 and/or DC to AC conversion to supply AC electrical power to industrial electrical machine 12.

Electronics module housing 34 is constructed to provide fluid ingress protection and prevent the ingress of fluids into the electronics module 14, i.e., to the interior of electronics module housing 34 and the electrical and electronic components disposed therein, e.g., power and control electronics 38. In one form, power and control electronics 38 are hermetically sealed within electronics module housing 34, e.g., to provide ingress protection and prevent fluid ingress during washdown. Electronics module 14 also includes an electronics module output plug-in electrical connector 46 and an electronics module input plug-in electrical connector 48. Electronics module output plug-in electrical connector 46 is electrically coupled to converter 42 and constructed to sealingly engage and electrically couple to plug-in electrical connector 24. Electronics module output plug-in electrical connector 46 is constructed to electrically couple converter 42 to industrial electrical machine 12, supply power to industrial electrical machine 12 from converter 42, and prevent fluid ingress to or around the terminals of the engaged plug-in connectors. Electronics module input plug-in electrical connector 48 is constructed to sealingly engage and electrically couple to power supply plug-in electrical connector 36 and receive electrical power from the power supply plug-in electrical connector 36 and supply the power to electronics module 14. In some embodiments, one or more of plug in connectors 36, 46 and 48 may be replaced by hard wired connections or manual terminations.

In some embodiments, electronics module input plug-in electrical connector 48 is electrically coupled to converter 42, and supplies DC electrical power received from power supply plug-in electrical connector 36 to converter 42. In some embodiments, electronics module input plug-in electrical connector 48 is electrically coupled to converter 42, and supplies AC electrical power received from power supply plug-in electrical connector 36 to converter 42. In either case, converter 42 is constructed to convert the input power supply to a suitable output power supply, AC (e.g., at a variable and/or fixed frequency, depending upon the application) or DC, for provision to industrial electrical machine 12

Electronics module output plug-in electrical connector 46 and electronics module input plug-in electrical connector 48 are multipronged electrical connectors. In one form, electronics module output plug-in electrical connector 46 is a multipronged female receptacle constructed to mate with and electrically couple to a male plug-in electrical connector 24, and electronics module input plug-in electrical connector 48 is a multipronged male plug constructed to mate with and electrically couple to a female power supply plug-in electrical connector 36. In other embodiments, output plug-in electrical connector 46 may be a multipronged male plug constructed to mate with and electrically couple to a female plug-in electrical connector 24; and/or input plug-in electrical connector 48 may be a multipronged female receptacle constructed to mate with and electrically couple to a male power supply plug-in electrical connector 36. In some embodiments, power supply plug-in electrical connector 36, electronics module output plug-in electrical connector 46 and electronics module input plug-in electrical connector 48 are 4-pin 230 V electrical connectors constructed to engage and electrically couple to mating 4-pin 230 V electrical connectors, e.g., standard 4-pin 230 V electrical connectors. In other embodiments, plug-in electrical connectors 36, 46 and 48 may be configured as a 480 V connectors or may be configured for or to accommodate other voltages and with any suitable power rating.

Electronics module output plug-in electrical connector 46 and electronics module input plug-in electrical connector 48 each include of a plurality of individual male or female connector terminals overmolded into (or potted into, in some embodiments) and extending through one or more walls of electronics module housing 34. For example, in one non-limiting example, electronics module output plug-in electrical connector 46 includes a plurality of individual female connector terminals 50 overmolded into and extending through a wall 52 of electronics module housing 34, and electronics module input plug-in electrical connector 48 includes a plurality of male connector terminals 56 overmolded into and extending through a wall 58 of electronics module housing 34, thus hermetically sealing walls 52 and 58 and preventing ingress, e.g., fluid ingress into electronics module 14 via electronics module output plug-in electrical connector 46 and electronics module input plug-in electrical connector 48. Electronics module output plug-in electrical connector 46, electronics module input plug-in electrical connector 48 and plug in electrical connector 24 each include respective fluid ingress protection shrouds 60, 62 and 64 which overlap when the electrical connectors are connected to a mating electrical connector and prevent fluid ingress into the connectors, e.g., during washdown. In some embodiments, a cable 66 (FIG. 6) may be disposed between electronics module housing 34 and electronics module output plug-in electrical connector 46, e.g., wherein cable 66 is hardwired to electronics module housing 34 power and control electronics 38. In some such embodiments, power and control electronics 38 may be subdivided between electronics module housing 34 and plug-in electrical connector 46.

In some embodiments, converter 42 provides a variable speed or frequency AC power output. This power output is supplied to electrical machine 12 via electronics module output plug-in electrical connector 46 and plug-in electrical connector 24, providing a variable speed output of industrial electrical machine 12. In some embodiments, power supply plug-in electrical connector 36 provides DC electrical power to electronics module 14, which is converted to the variable frequency AC power by converter 42 and delivered to industrial electrical machine 12 via electronics module output plug-in electrical connector 46 and plug-in electrical connector 24. In other embodiments, power supply plug-in electrical connector 36 provides fixed frequency AC electrical power to electronics module 14, which is converted to variable frequency AC power by converter 42 for delivery to industrial electrical machine 12 via electronics module output plug-in electrical connector 46 and plug-in electrical connector 24. In some embodiments, electronics module 14 may include, e.g., as part of power and control electronics 38, power protection electronics, such as for example soft starters.

The use of plug-in electrical connector 24, electronics module output plug-in electrical connector 46 and electronics module input plug-in electrical connector 48 allow easy electrical connection of electrical machine 12 and electronics module 14 to each other, and to a power supply, which may reduce the cost of installation of industrial electrical machine system 10 compared to conventional systems in which skilled professionals are required to make wiring connections. In addition, the polymeric housings 16 and 34 are constructed to withstand washdown chemicals and procedures, and provide a lower cost solution to stainless steel and in some cases painted steel housings. Further, the polymeric housings 16 and 34 do not provide a source of contamination as may painted steel housings, e.g., in the food and beverage industry.

Embodiments of the present invention include an industrial electrical machine system, comprising: an industrial electrical machine including a first housing and a first plug-in electrical connector disposed on the first housing; and an electronics module including a second housing; a converter disposed in the second housing and constructed to convert an input electrical power to an output electrical power; a second plug-in electrical connector electrically coupled to the converter and constructed to sealingly engage and electrically couple to the first plug-in electrical connector and electrically couple the converter to the industrial electrical machine and supply the output electrical power to the industrial electrical machine from the converter, wherein the industrial electrical machine is a motor, a generator or a motor/generator.

In a refinement, the electronics module further includes a third plug-in electrical connector constructed to supply the input electrical power to the electronics module.

In another refinement, the one of the second plug-in electrical connector and the third plug-in electrical connector is a multipronged male plug, and wherein the other of the second plug-in electrical connector and the third plug-in electrical connector is a multipronged female receptacle.

In yet another refinement, the second housing is a polymeric housing; and wherein the drive and the converter are hermetically sealed within the polymeric housing.

In still another refinement, the second and third plug-in electrical connector each include of a plurality of individual connector terminals overmolded into and extending through a wall the polymeric housing.

In yet still another refinement, the first, second and third plug-in electrical connectors each include a fluid ingress protection shroud.

In a further refinement, the first plug-in electrical connector includes a plurality of individual connector terminals overmolded or potted into a wall of the first housing and extending through the wall.

In a yet further refinement, the first housing and the second housing are constructed to provide fluid ingress protection and prevent the ingress of fluids into the respective electrical machine and electronics module.

In a still further refinement, the electronics module is constructed to receive AC electrical power and convert the AC electrical power into DC electrical power or into AC electrical power with a variable frequency, or to receive DC electrical power and convert the DC electrical power into AC electrical power.

In a yet still further refinement, the industrial electrical machine is a polymer injection-molded industrial electric motor.

In another further refinement, the industrial electrical machine system further comprises a cable disposed between the second plug-in connector and the second housing.

Embodiments of the present invention include an industrial electrical motor system, comprising: an industrial electric motor including a polymeric motor housing and a motor input plug-in electrical connector extending from the motor polymeric housing; and an electronics module including a polymeric electronics module housing and power and control electronics disposed in the electronics module polymeric housing, the power and control electronics including a converter constructed to convert an input electrical power to an output electrical power; an electronics module output plug-in electrical connector electrically coupled to the converter and constructed to engage the motor input plug-in electrical connector and electrically couple the converter to the industrial electric motor and supply the output electrical power to the industrial electric motor from the converter; and an electronics module input plug-in electrical connector constructed to supply the input electrical power to the electronics module.

In a refinement, the motor input plug-in electrical connector, the electronics module output plug-in electrical connector and electronics module input plug-in electrical connector are constructed to engage and electrically couple to a standard 4-pin 230 V electrical connector.

In another refinement, the motor input plug-in electrical connector includes a plurality of individual male or female connector terminals overmolded into and extending through the polymeric motor housing.

In yet another refinement, the converter is hermetically sealed within the polymeric electronics module housing.

In still another refinement, the electronics module output plug-in electrical connector and the electronics module input plug-in electrical connector each include of a plurality of individual male or female connector terminals overmolded into and extending through a wall of the second polymeric housing.

In yet still another refinement, the polymeric motor housing and the polymeric electronics module housing are constructed to provide fluid ingress protection and prevent the ingress of fluids into the respective industrial electric motor and electronics module.

In a further refinement, the electronics module is constructed to receive AC electrical power at a fixed frequency and convert the AC electrical power at a fixed frequency into AC electrical power with a variable frequency.

Embodiments of the present invention include an electronics module for operating an industrial electric motor with power supplied from a power supply plug-in electrical connector, comprising: a polymeric housing; power and control electronics disposed in the polymeric housing, the power and control electronics including a converter constructed to convert an input electrical power to an output electrical power; an electronics module output plug-in electrical connector electrically coupled to the converter and constructed to sealingly engage a motor input plug-in electrical connector and electrically couple the converter to the industrial electric motor and supply the output electrical power to the industrial electric motor from the converter; and an electronics module input plug-in electrical connector constructed to sealingly engage the power supply plug-in electrical connector and receive the input electrical power from the power supply plug-in electrical connector and supply the input electrical power to the electronics module.

In a refinement, the drive and the converter are hermetically sealed within the polymeric housing.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. An industrial electrical machine system, comprising:
an industrial electrical machine including a first housing and a first plug-in electrical connector that includes a connector housing that is integral with the first housing; and
an electronics module including a second housing; a converter hermetically sealed within the second housing and constructed to convert an input electrical power to an output electrical power; a second plug-in electrical connector electrically coupled to the converter and constructed to sealingly engage and electrically couple to the first plug-in electrical connector and electrically couple the converter to the industrial electrical machine and supply the output electrical power to the industrial electrical machine from the converter,
wherein the industrial electrical machine is a motor, a generator or a motor/generator, and
wherein the second housing is a polymeric housing.

2. The industrial electrical machine system of claim 1, wherein the electronics module further includes a third plug-in electrical connector constructed to supply the input electrical power to the electronics module.

3. The industrial electrical machine system of claim 2, wherein the one of the second plug-in electrical connector and the third plug-in electrical connector is a multipronged male plug, and wherein the other of the second plug-in electrical connector and the third plug-in electrical connector is a multipronged female receptacle.

4. The industrial electrical machine system of claim 2, wherein the second and third plug-in electrical connector each include of a plurality of individual connector terminals overmolded into and extending through a wall the polymeric housing.

5. The industrial machine system of claim 2, wherein the first, second and third plug-in electrical connectors each include a fluid ingress protection shroud that overlaps a complementary fluid ingress protective shroud of a respective mated plug-in electrical connector.

6. The industrial electrical machine system of claim 1, wherein the first plug-in electrical connector includes a plurality of individual connector terminals overmolded or potted into a wall of the first housing and extending through the wall.

7. The industrial electrical machine system of claim 1, wherein the first housing and the second housing are constructed to provide fluid ingress protection and prevent the ingress of fluids into the respective electrical machine and electronics module.

8. The industrial electrical machine system of claim 1, wherein the electronics module is constructed to receive AC electrical power and convert the AC electrical power into DC electrical power or into AC electrical power with a variable frequency, or to receive DC electrical power and convert the DC electrical power into AC electrical power.

9. The industrial electrical machine system of claim 1, wherein the industrial electrical machine is a polymer injection-molded industrial electricmotor.

10. The industrial electrical machine system of claim 1, further comprising a cable disposed between the second plug-in connector and the second housing.

11. The industrial electrical machine system of claim 1, wherein control electronics are hermetically sealed in the second housing.

12. An industrial electrical motor system, comprising:
an industrial electric motor including a polymeric motor housing and a motor input plug-in electrical connector extending from at least a stator band of the polymeric motor housing; and
an electronics module including a polymeric electronics module housing and power and control electronics disposed in the polymeric electronics module housing, the power and control electronics including a converter constructed to convert an input electrical power to an output electrical power; an electronics module output plug-in electrical connector electrically coupled to the converter and constructed to engage the motor input plug-in electrical connector and electrically couple the converter to the industrial electric motor and supply the output electrical power to the industrial electric motor from the converter; and an electronics module input plug-in electrical connector constructed to supply the input electrical power to the electronics module,
wherein the converter and the control electronics are hermetically sealed within the polymeric electronics module housing.

13. The industrial electrical machine system of claim 12, wherein the motor input plug-in electrical connector, the electronics module output plug-in electrical connector and electronics module input plug-in electrical connector are constructed to engage and electrically couple to a standard 4-pin 230 V electrical connector.

14. The industrial electrical machine system of claim 12, wherein the motor input plug-in electrical connector includes a plurality of individual male or female connector terminals overmolded into and extending through the polymeric motor housing.

15. The industrial electrical machine system of claim 12, wherein the electronics module output plug-in electrical connector and the electronics module input plug-in electrical connector each include of a plurality of individual male or female connector terminals overmolded into and extending through a wall of the second polymeric housing.

16. The industrial electrical machine system of claim 12, wherein the polymeric motor housing and the polymeric electronics module housing are constructed to provide fluid ingress protection and prevent the ingress of fluids into the respective industrial electric motor and electronics module, and wherein a connector housing of the motor input plug-in electrical connector outwardly projects from, and is integral with, at least the stator band.

17. The industrial electrical machine system of claim 12, wherein the electronics module is constructed to receive AC electrical power at a fixed frequency and convert the AC electrical power at a fixed frequency into AC electrical power with a variable frequency.

18. An electronics module for operating an industrial electric motor with power supplied from a power supply plug-in electrical connector, comprising:
a polymeric housing;
power and control electronics disposed in the polymeric housing, the power and control electronics including a converter constructed to convert an input electrical power to an output electrical power;
an electronics module output plug-in electrical connector electrically coupled to the converter and constructed to sealingly engage a motor input plug-in electrical connector and electrically couple the converter to the industrial electric motor and supply the output electrical power to the industrial electric motor from the converter; and an electronics module input plug-in electrical connector constructed to sealingly engage the power supply plug-in electrical connector and receive the input electrical power from the power supply plug-in electrical connector and supply the input electrical power to the electronics module, wherein the power and control electronics and the converter are hermetically sealed within the polymeric housing.

* * * * *